United States Patent [19]

Hatanaka

[11] Patent Number: 4,605,972
[45] Date of Patent: Aug. 12, 1986

[54] IMAGE FORMING METHOD
[75] Inventor: Isamu Hatanaka, Kaisei, Japan
[73] Assignee: Fuji Photo Film Co., Ltd., Tokyo, Japan
[21] Appl. No.: 646,911
[22] Filed: Aug. 31, 1984
[30] Foreign Application Priority Data Sep. 5, 1983 [JP] Japan .................................. 58-162909
Jul. 26, 1984 [JP] Japan .................................. 59-156273

[51] Int. Cl.⁴ ....................... H04N 1/23; G01D 15/14; G02F 1/13
[52] U.S. Cl. .................................... 358/302; 358/296; 346/160; 350/332
[58] Field of Search ........................... 346/107 R, 160; 358/298, 300, 302; 350/332

[56] References Cited

U.S. PATENT DOCUMENTS 4,048,628  9/1977  Boswell ........................... 350/332 X
4,486,760  12/1984  Funada et al. .................. 346/107 R

FOREIGN PATENT DOCUMENTS 39310   3/1977  Japan ................................... 358/298
160667  4/1982  Japan .

Primary Examiner—E. A. Goldberg
Assistant Examiner—Patrick W. Foster
Attorney, Agent, or Firm—Pasquale A. Razzano

[57] ABSTRACT

In a method for forming an image, a liquid crystal shutter array or matrix is positioned between a photosensitive material and a light source, and light emitted by the light source to the photosensitive material is controlled by driving each liquid crystal shutter portion constituting a picture element of the liquid crystal shutter array or matrix. Drive of the liquid crystal shutter portion is controlled by using the driving pulses having a pulse width shorter than the response time of the liquid crystal and by changing the pulse width or the number of the driving pulses in accordance with an image signal. The photosensitive material is of the type which can express a half tone. When the liquid crystal shutter array or matrix which intercepts light upon application of a voltage is used, the driving pulses are applied prior to exposure to intercept light. Then application of the driving pulses is stopped for a time corresponding to the image signal so that the liquid crystal shutter allows the light to pass therethrough.

9 Claims, 16 Drawing Figures

IMAGE FORMING METHOD

BACKGROUND OF THE INVENTION

1. Field of the Invention

This invention relates to an image forming method wherein an image is reproduced by driving a liquid crystal shutter array or a liquid crystal shutter matrix by use of a signal carrying the image, and recording the image on a photosensitive material. This invention particularly relates to an image forming method which forms a wide range of half tones.

2. Description of the Prior Art

A novel image forming method is disclosed, for example, in Japanese Unexamined Patent Publication No. 57(1982)-160667. In the image forming method, a liquid crystal shutter array or a liquid crystal shutter matrix (hereinafter referred to as a liquid crystal shutter panel) comprising many sets of transparent electrodes is positioned on the surface of a photosensitive material exposed to light. Each liquid crystal shutter portion constituting a picture element of the liquid crystal shutter panel is driven by a signal carrying an image, and the image is reproduced thereby in the liquid crystal shutter panel. The photosensitive material is exposed to light passing imagewise through the liquid crystal shutter panel, thereby recording the image therein. On the other hand, liquid crystal shutter panels which can express gradation have heretofore been used, for example, in liquid crystal televisions. When the liquid crystal shutter panels of this type are used in the aforesaid image forming method, it becomes possible to record a half tone image in a photosensitive material.

However, in the conventional liquid crystal shutter panels which can express gradation, the number of gradation levels which can be expressed is limited to a range of approximately 8 to approximately 16. When the liquid crystal shutter panels are used in the aforesaid image forming method, it is not possible to obtain a smooth image, and the flesh color cannot be expressed sufficiently in the case of a color image.

SUMMARY OF THE INVENTION

The primary object of the present invention is to provide an image forming method using a liquid crystal shutter panel, which forms a pictorial image having a high quality and including approximately 64 levels of gradation.

Another object of the present invention is to provide an image forming method using a liquid crystal shutter panel, which adjusts gradation very finely and which is applicable to a photosensitive material exhibiting a wide latitude of exposure.

The specific object of the present invention is to provide an image forming method using a liquid crystal shutter panel, which eliminates the necessity of changing the liquid crystal shutter panel in accordance with the color of light when a color image is formed.

The present invention provides an image forming method in which a liquid crystal shutter panel as a light valve is positioned between a photosensitive material and a light source, and light emitted by said light source to said photosensitive material is controlled by driving each liquid crystal shutter portion constituting a picture element of said liquid crystal shutter panel, thereby conducting imagewise exposure of said photosensitive material to the light, wherein the improvement comprises controlling the drive of said liquid crystal shutter portion by using the driving pulses having a pulse width shorter than the response time of the liquid crystal and by changing the effective duration of said driving pulses by changing the pulse width or the number of said driving pulses in accordance with an image signal, and using a photosensitive material which can express a half tone as said photosensitive material.

The present invention also provides an image forming method in which a liquid crystal shutter panel as a light valve is positioned between a photosensitive material and a light source, and light emitted by said light source to said photosensitive material is controlled by driving each liquid crystal shutter portion constituting a picture element of said liquid crystal shutter panel, thereby conducting imagewise exposure of said photosensitive material to the light, wherein the improvement comprises using a liquid crystal shutter panel of the type intercepting light upon application of a voltage thereto as said liquid crystal shutter panel, continuously applying a pulse voltage having a pulse width shorter than the response time of the liquid crystal to the liquid crystal shutter panel prior to the exposure of said photosensitive material to the light, thereby intercepting the light, thereafter stopping the application of the voltage to the liquid crystal shutter for a time corresponding to an image signal so that the liquid crystal shutter allows the light to pass therethrough, and using a photosensitive material which can express a half tone as said photosensitive material.

In the image forming method of the present invention mentioned last, since gradation can be adjusted very finely, it is possible to obtain a smooth image including a wide range of half tones. Further, since a photosensitive material exhibiting a wide latitude of exposure can be used, it is possible to obtain an image of a wide dynamic range. Also, it becomes unnecessary to change the liquid crystal shutter panel in accordance with the color of light when a color image is formed. Therefore, the configuration and operation of an image forming apparatus are simplified.

DESCRIPTION OF THE PREFERRED EMBODIMENTS

The present invention will hereinbelow be described in further detail with reference to the accompanying drawings.

Figure 1:
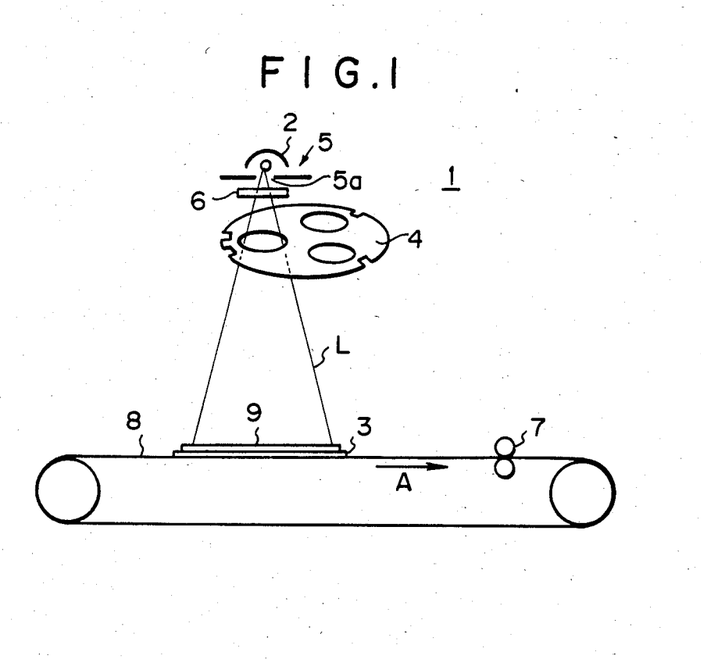
FIG. 1 is a schemtic view showing a printer wherein an embodiment of the image forming method in accordance with the present invention is employed.

FIG. 1 shows a printer 1 for recording an image by an embodiment of the image forming method in accordance with the present invention. By way of example, the printer 1 is used for forming a color print by a three-color separation method. Between a point light source 2 such as a halogen lamp or a xenon lamp and a color photosensitive material 3 exposed to light L emitted by the point light source 2 is positioned an RGB(red, green and blue) filter 4 for rotation by a driving unit (not shown). On the front side of the point light source 2 is positioned a stop 5 having a pinhole 5a for removing the scattered light components of the light L emitted by the point light source 2 so that the point light source 2 acts in the same manner as an ideal point light source. Between the stop 5 and the RGB filter 4 is positioned a correction filter 6 for conducting color correction of the light L.

Figure 2:
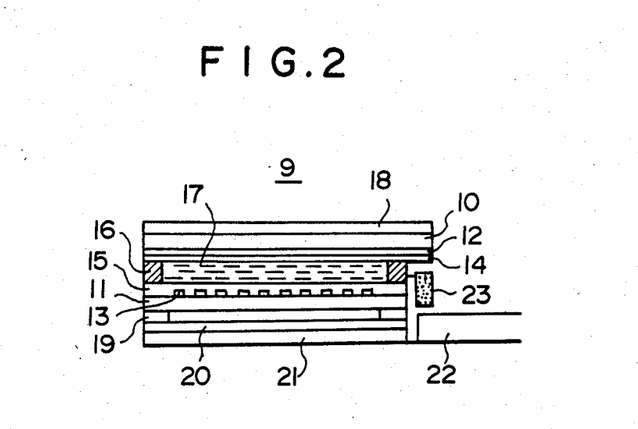
FIG. 2 is a transverse sectional view showing the liquid crystal shutter panel used in the printer of FIG. 1.
Figure 3:
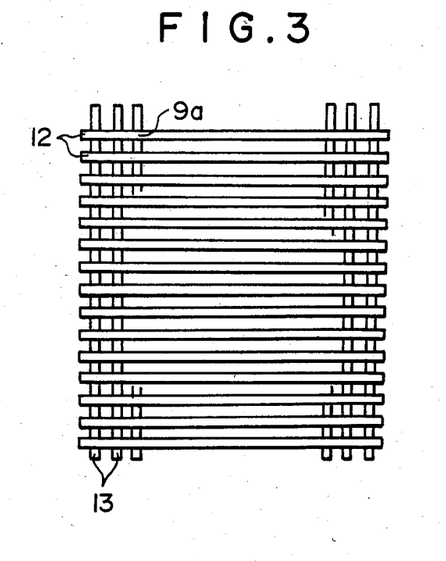
FIG. 3 is a plan view showing the transparent electrodes of the liquid crystal shutter panel of FIG. 2.

The color photosensitive material 3 is fabricated of a high-sensitivity silver halide photosensitive material which can express a half tone and which exhibits toe-cut characteristics as will be described later. The photosensitive material 3 is supported on a conveyor belt 8 rotated by a drive roll 7 and is conveyed in the direction as indicated by the arrow A. Above the conveyor belt 8 is positioned a liquid crystal shutter panel 9 in contact with the color photosensitive material 3. The liquid crystal shutter panel 9 is of the known matrix type. As shown in FIG. 2, the liquid crystal shutter panel 9 comprises an upper glass layer 10 and a lower glass layer 11 standing face to face with each other, and transparent transverse electrodes 12 and transparent longitudinal electrodes 13 aligned respectively on the inner surfaces of the upper glass layer 10 and the lower glass layer 11. On the surfaces of the transverse electrodes 12 and the longitudinal electrodes 13 are positioned orientation films 14 and 15 respectively for orientating the nematic liquid crystal molecules in a single direction. As shown in FIG. 3, the transverse electrodes 12 and the longitudinal electrodes 13 are positioned so that they intersect perpendicularly to each other. The orientation films 14 and 15 are positioned to stand face to face with each other in spaced relation with a sealing member 16 intervening therebetween along the peripheral portions thereof. In the space between the orientation films 14 and 15 is confined a twisted nematic liquid crystal 17. By the orientation films 14 and 15, the directions of orientation of the molecules of the liquid crystal 17 at the transverse electrodes 12 and the longitudinal electrodes 13 are deviated by 90° with respect to each other. On the outer surface of the upper glass layer 10 is positioned a polarizing plate 18 with the axis of polarization parallel with the direction of orientation of the liquid crystal molecules at the surface of the transverse electrodes 12. On the outer surface of the lower glass layer 11 is positioned a polarizing plate 21 via a metal mask 19 and a filter 20. The axis of polarization of the polarizing plate 21 is parallel with the axis of polarization of the polarizing plate 18. The structure thus constructed is supported by a printed circuit board 22, and a voltage is applied across the transverse electrodes 12 and longitudinal electrodes 13 via a conductive rubber connector 23.

In the liquid crystal shutter panel 9 as described above, when no voltage is applied across the transverse electrodes 12 and the longitudinal electrodes 13, the light passing through the polarizing plate 18 impinges upon the layer of the liquid crystal 17 as linear polarized light and reaches the polarizing plate 21 with the plane of polarization rotated by 90° in accordance with the orientation of the molecules of the liquid crystal 17. Since the axes of the polarizing plates 21 and 18 are parallel with each other as described above, the light impinging upon the polarizing plate 21 with the plane of polarization rotated by 90° is intercepted by the polarizing plate 21. On the other hand, when a voltage higher than a threshold value is applied across the transverse electrodes 12 and the longitudinal electrodes 13, the direction of the molecules of the liquid crystal 17 is changed by 90° by the field effect between the transverse electrodes 12 and the longitudinal electrodes 13. Therefore, the light passing through the upper polarizing plate 18 impinges upon the lower polarizing plate 21 without changing the plane of polarization and passes through the polarizing plate 21. In the matrix type liquid crystal shutter panel 9 as described above, by selecting the electrodes to which the voltage is applied from the transverse electrodes 12 and the longitudinal electrodes 13 positioned to intersect perpendicularly to each other, it is possible to set the portions at which the transverse electrodes 12 and the longitudinal electrodes 13 intersect each other as light portions (i.e. light passing portions) or as dark portions (i.e. light intercepting portions), thereby forming a desired image. That is, as shown in FIG. 3, each of the portions at which the transverse electrodes 12 and the longitudinal electrodes 13 intersect each other constitutes one picture element 9a.

Figure 4:
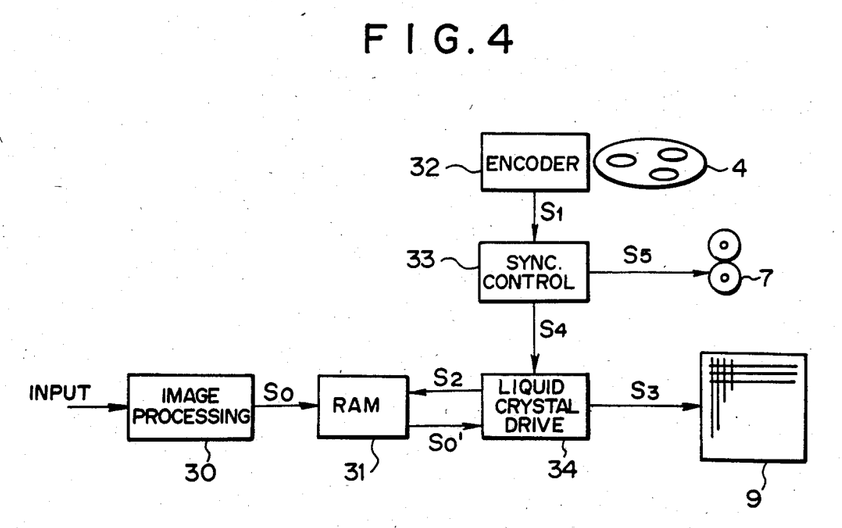
FIG. 4 is a block diagram showing the control circuit configuration of the printer of FIG. 1.

FIG. 4 is a block diagram showing the circuit for controlling the printer of FIG. 1. An image signal is input to an image processing circuit 30 which calculates image density and RGB information (i.e. information on red, green and blue) of each picture element 9a, and outputs an image signal S0 carrying the calculated image density and RGB information. The image signal S0 is stored in a random access memory (RAM) 31. On the other hand, the rotating position of the RGB filter 4 is detected by an encoder 32, and a filter position signal S1 generated by the encoder 32 is input to a synchronization controlling circuit 33.

A liquid crystal shutter panel driving circuit 34 of the type known for sequential linear scanning of a matrix type liquid crystal shutter panel is used for sequentially energizing the transverse electrodes 12 with predetermined timing. Also, on the basis of a timing signal S2 synchronous with the timing of energizing of the transverse electrodes 12, the liquid crystal shutter panel driving circuit 34 reads an image signal S0' corresponding to the picture element 9a constituted by the selected one of the transverse electrodes 12 from the RAM 31. On the basis of the image density information of the image signal S0', the liquid crystal shutter panel driving circuit 34 selectively sets the longitudinal electrodes 13 to the energized condition.

Figure 5:
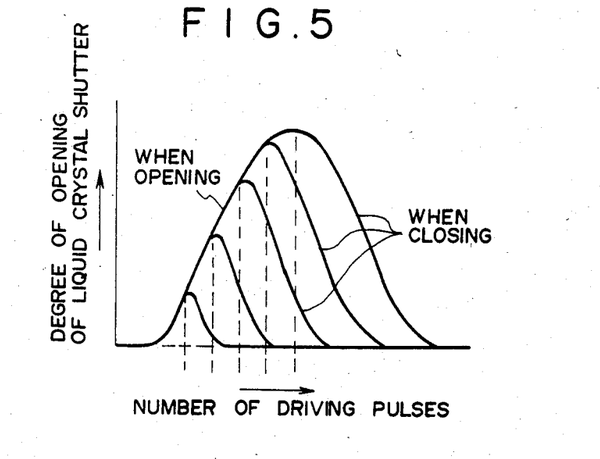
FIG. 5 is an explanatory view showing the operation of the liquid crystal shutter panel in the printer of FIG. 1.
Figure 6:
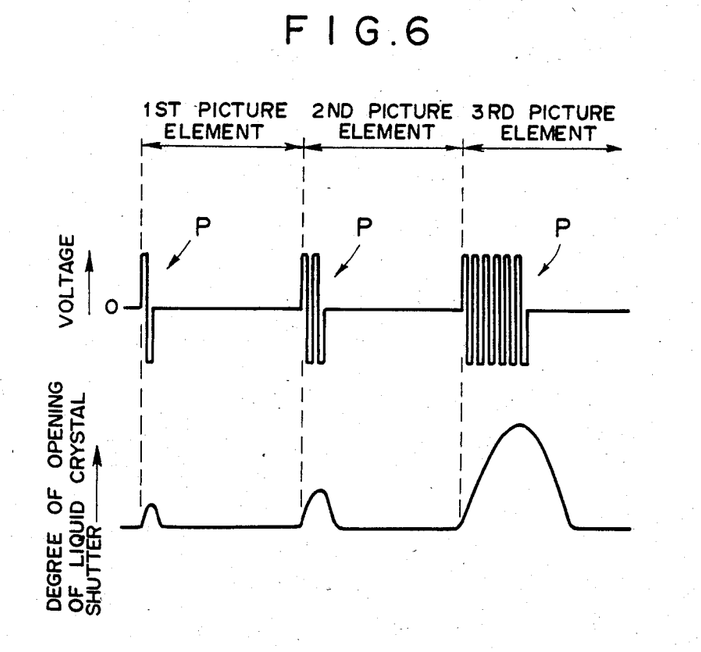
FIG. 6 is an explanatory view showing the method of controlling the drive of the liquid crystal shutter panel in the embodiment of FIG. 1.

The setting of the longitudinal electrodes 13 to the energized condition is carried out by the application of driving pulses at such a predetermined voltage that the voltage across the transverse electrodes 12 and the longitudinal electrodes 13 becomes higher than the aforesaid threshold value. The pulse width of the driving pulses is adjusted sufficiently shorter than the response time of the liquid crystal 17. Therefore, as shown in FIG. 5, the degree of opening of the liquid crystal shutter panel 9, i.e. the amount of rotation of the molecules of the liquid crystal 17 by orientation, increases as the number of the driving pulses applied is increased. Accordingly, as shown in FIG. 6, when the number of driving pulses P is increased or decreased in accordance with the level of the image density on the basis of the image density information of the image signal S0', the degree of opening of the liquid crystal shutter panel at each picture element 9a is changed. Thus the lightness of the picture element 9a is changed, and a half tone is represented. By way of example, in the case where the response time of the liquid crystal 17 is 20 msec. and 64 levels of gradation should be obtained in the liquid crystal shutter panel 9 comprising 1,000 picture elements 9a, the pulse width of the driving pulses P is adjusted to approximately 0.2 msec. When the pulse width is 0.2 msec., the time required for driving 1,000 picture elements is 12.8 sec. ($=0.2$ msec.$\times 64 \times 1,000 \times 1/1,000$), which is practically applicable.

As described above, each picture element 9a constituted by the selected one of the transverse electrodes 12 is adjusted to a desired light-dark condition of a half tone. A driving signal S4 for sequentially conducting the aforesaid operation for all of the transverse electrodes 12 is input to the liquid crystal shutter panel 9, and an image comprising the picture elements 9a adjusted to the light and dark conditions is reproduced in the liquid crystal shutter panel 9.

In this manner, a density image is formed in the liquid crystal shutter panel 9 by generating the light and dark portions including a half tone therein. Also, the synchronizing signal S4 is input from the synchronization controlling circuit 33 to the liquid crystal shutter panel driving circuit 34. Thus the timing of each color filter of the RGB filter 4 positioned within the exposure system and the timing of each picture element 9a selected in the light condition are controlled on the basis of the RGB information of the image signal S0', thereby adjusting the light passing through the picture element 9a to a desired hue.

The color photosensitive material 3 is exposed to the light L passing through the liquid crystal shutter panel 9 in accordance with the image constituted by the picture elements 9a adjusted to the desired hue and density. Therefore, when the sequential linear scanning of the matrix type liquid crystal shutter panel 9 is finished, a driving signal S5 is output by the synchronization controlling circuit 33 to the drive roll 7 to rotate the conveyor belt 8 and remove the color photosensitive material 3 from the exposure system.

Figure 7:
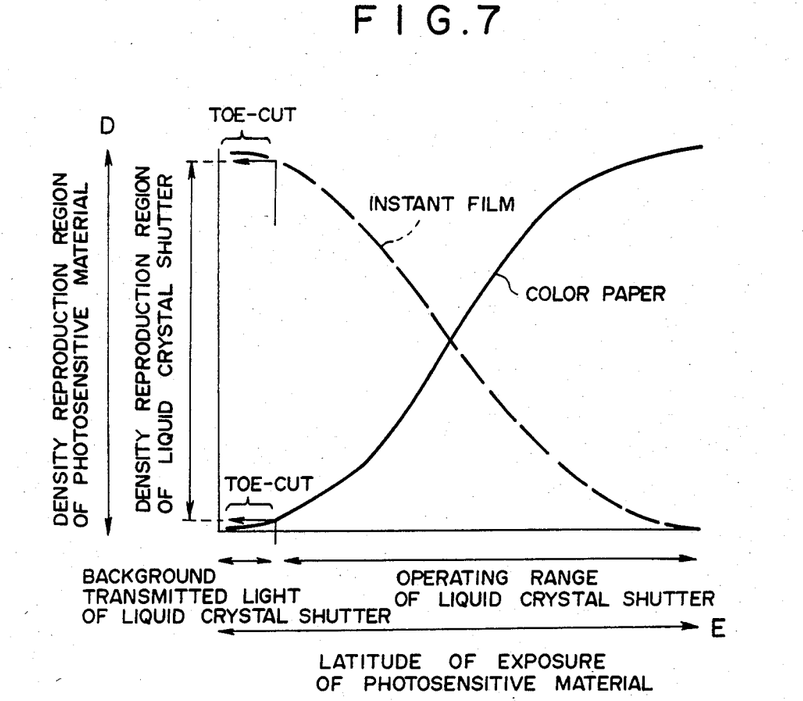
FIG. 7 is a graph showing the characteristics of the photosensitive material used in the embodiment of FIG. 1.

The color photosensitive material 3 can express a half tone. Therefore, the image having gradation formed in the liquid crystal shutter panel 9 is recorded with the gradation maintained in the color photosensitive material 3. Further, the color photosensitive material 3 is of the type exhibiting the toe-cut characteristics. Accordingly, as shown in FIG. 7, even when a liquid crystal exhibiting a high level of background transmitted light, i.e. a generally small contrast ratio, is used, the effect thereof does not appear as a difference in density, and it is possible to obtain an image exhibiting good whiteness and good blackness. In FIG. 7, the full line indicates the characteristics of a photosensitive material such as color paper, and the broken line indicates the characteristics of a photosensitive material such as instant film. It is generally known that, silver halide photosensitive materials exhibit best half tone reproduction characteristics, they also exhibit the toe-cut characteristics. Specifically, when the silver halide photosensitive materials are blackened by high energy particles such as electron rays, they do not exhibit the toe-cut characteristics. However, when they are blackened by light, no developing nucleus is formed unless the number of photons is larger than a predetermined number. When the number of photons is smaller than the predetermined number, a loss arises with the photoelectrons. That is, they exhibit the toe-cut (higher contrast in the lower density level) characteristics. In general, in order to obtain continuous characteristics without toe cutting, different grains are mixed with the silver halide photosensitive materials or applied as a different layer. For use in combination with the liquid crystal shutter panel, a photosensitive material exhibiting inherent toe-cut characteristics of the silver halide photosensitive materials (a photosensitive material exhibiting a $\gamma$-value within the range of approximately 1 to 3) is rather suitable than those exhibiting the continuous characteristics.

When a photosensitive material requiring ordinary development processing is used as the color photosensitive material 3, it is possible to feed the color photosensitive material 3 automatically to a development unit by the conveyor belt 8. As the color photosensitive material 3, it is also possible to use an instant film. In this case, the ordinary development unit is not used, and a print is obtained immediately by passing the film between processing liquid spreading rolls.

The circuit for driving the sequential linear scanning of the matrix type liquid crystal shutter panel 9 as described above can be constituted by known shift registers or the like. Also, the circuit for modulating the image density to driving pulses can be constituted by a known circuit.

In the embodiment as described above, the amount of rotation of the molecules of the liquid crystal 17 by orientation is changed by changing the number of driving pulses P applied to the longitudinal electrodes 13. However, the same effect as the control of the number of driving pulses applied can be obtained also by controlling the pulse width of the liquid crystal driving pulses within the range of time shorter than the response time of the liquid crystal. In this case, too, it is possible to form an image having gradation in the liquid crystal shutter panel 9. As used herein, the "effective duration" of the driving pulses means the number of driving pulses that are applied during a predetermined period or the width of a driving pulse that is applied during that period.

Figures 9A, 9B:
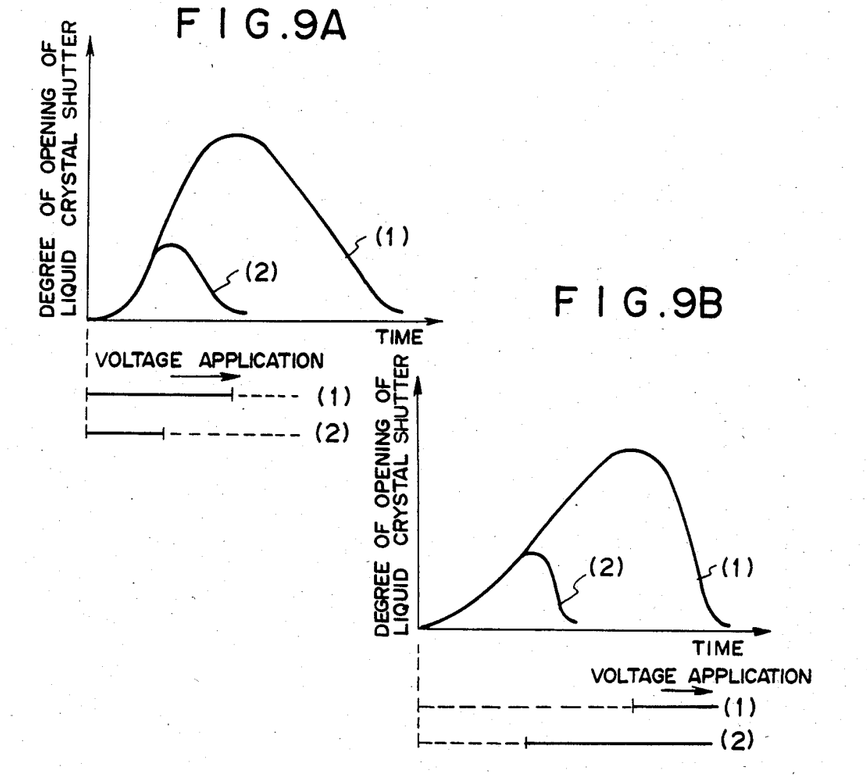
FIGS. 9A and 9B are graphs respectively showing the response characteristics of the liquid crystal shutter panel used in the embodiment of FIG. 1 and the liquid crystal shutter panel used in the embodiment of FIG. 8.
Figure 10:
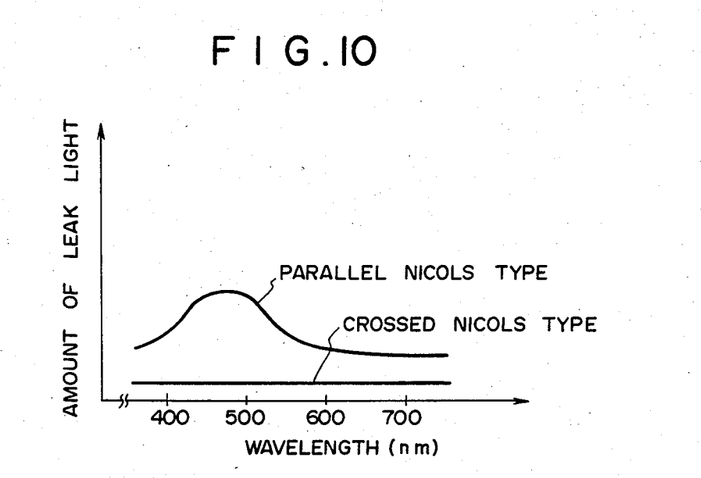
FIG. 10 is a graph showing the relationship between the light wavelength and the leak light amount in the liquid crystal shutter panel used in the embodiment of FIG. 1 and the liquid crystal shutter panel used in the embodiment of FIG. 8.

In the embodiment of the image forming method as described above, when the normally light intercepting type liquid crystal shutter such as a parallel nicols type twisted nematic liquid crystal shutter is used and opened by the application of the voltage, the opening response of the liquid crystal shutter is comparatively quick as shown in FIG. 9A. Therefore, it is not always possible to adjust the gradation more finely by precisely controlling the degree of opening of the liquid crystal shutter within the short opening response time. Further, as is well known, the amount of leak light in the parallel nicols type twisted nematic liquid crystal shutter is comparatively large and differs depending on the wavelength of the light as shown in FIG. 10. Therefore, the liquid crystal shutter of this type is not suitable for the case where a photosensitive material exhibiting a small γ-value, i.e. a small gradient of the straight portion of the characteristic curve, and a wide latitude of exposure. Also, in the case where it is necessary to minimize the amount of leak light when a color image is formed, the liquid crystal shutter panel must be changed to match the color of light. These problems can be solved by the embodiments of the image forming method in accordance with the present invention as described below.

Figure 8:
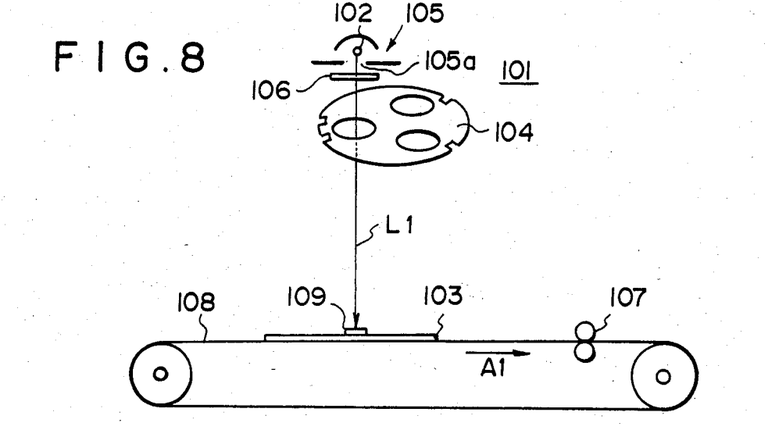
FIG. 8 is a schematic view showing a printer wherein another embodiment of the image forming method in accordance with the present invention is employed.

FIG. 8 shows a printer 101 for recording an image by another embodiment of the image forming method in accordance with the present invention. By way of example, the prenter 101 is used for forming a color print by a three-color separation method. Between a linear light source 102 for emitting white light and a color photosensitive material 103 exposed to light L emitted by the linear light source 102 is positioned an RGB filter 104 for rotation by a driving unit (not shown). On the front side of the linear light source 102 is positioned a stop 105 having a slit 105a for removing the scattered light components of the light L1 emitted by the linear light source 102. Between the stop 105 and the RGB filter 104 is positioned a correction filter 106 for conducting color correction of the light L1. As the light source, instead of using the linear light source, it is also possible to use a point light source.

The color photosensitive material 103 is fabricated of a high-sensitivity silver halide photosensitive material which can express a half tone and which exhibits toe-cut characteristics as described with reference to the embodiment of FIG. 1. The photosensitive material 103 is supported on a conveyor belt 108 rotated by a drive roll 107 and is conveyed in the direction as indicated by the arrow A1. Above the conveyor belt 108 is positioned a liquid crystal shutter panel 109 in contact with the color photosensitive material 103. The liquid crystal shutter panel 109 is of the known array type and has a configuration similar to that of the liquid crystal shutter panel 9 as shown in FIG. 2, except that the axis of polarization of the upper polarizing plate 18 in FIG. 2 is deviated by 90° with respect to the axis of polarization of the lower polarizing plate 21, thereby constituting the crossed nicols type. The liquid crystal shutter panel 109 thus constructed allows light to pass therethrough when no voltage is applied thereto, and intercepts light when a voltage is applied. As shown in FIG. 9B, when a voltage is applied in advance to the crossed nicols type twisted nematic liquid crystal shutter panel 109 to close it and then the application of the voltage is ceased, the liquid crystal shutter panel 109 exhibits comparatively slow opening response. Also, the closing response thereof is quick.

Figure 11:
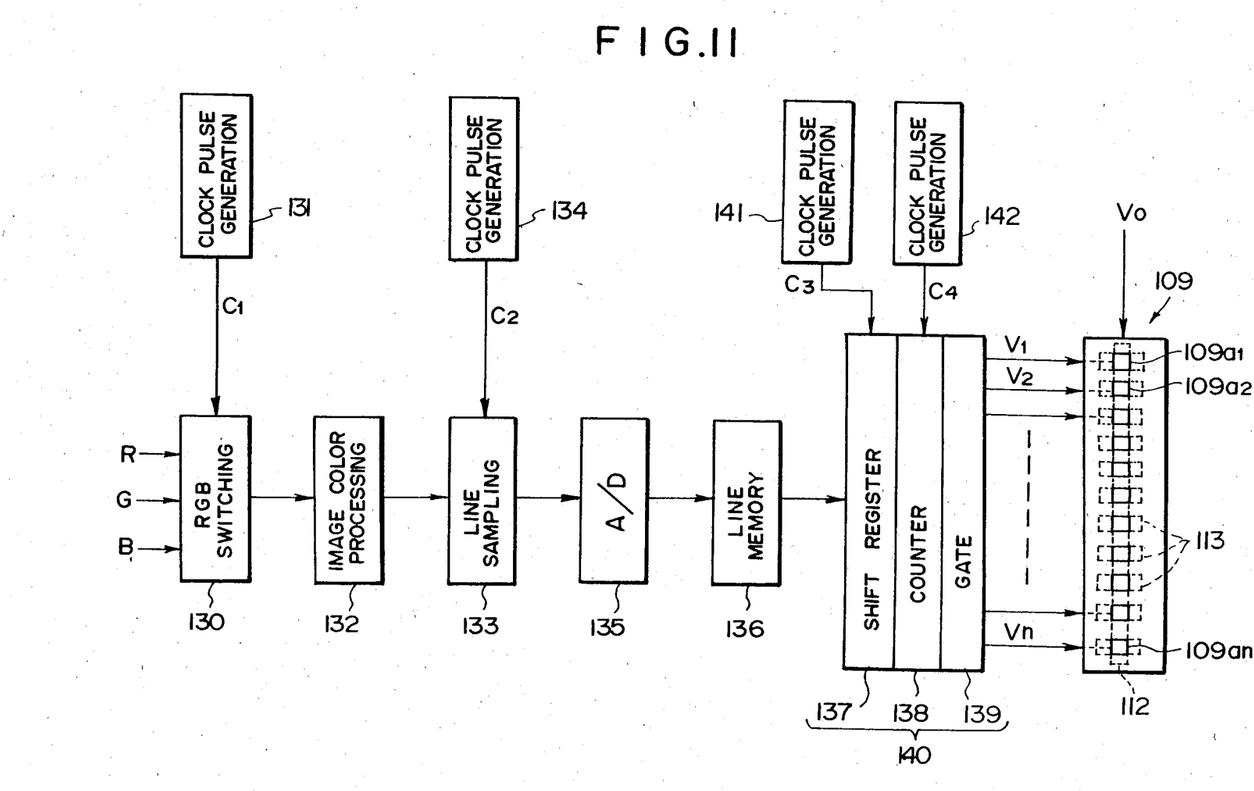
FIG. 11 is a block diagram showing the control circuit configuration of the printer of FIG. 8.

FIG. 11 shows the circuit configuration for controlling the printer of FIG. 8. R (red), G (green) and B (blue) color signals are input to an RGB switching circuit 130 which sequentially selects and outputs them on the basis of RGB switching clock pulses C1 input by a clock pulses generating circuit 131. The signals carrying color densities are subjected to predetermined image and color processings in an image processing circuit 132. Then the signals of each line, i.e. each picture element row (each row of the portions 109a at which the transverse electrode 112 and the longitudinal electrodes 113 intersect each other) of the array type liquid crystal shutter panel 109, are sampled by a line sampling circuit 133 on the basis of line clock pulses C2 input by a clock pulse generating circuit 134. The image signals of each line thus sampled are digitally converted by an A/D conversion circuit 135 and stored in a line memory 136 constituted by a RAM.

The image signals of each line which are read out of the line memory 136 are input to a liquid crystal shutter panel driver 140 which consists of a shift register 137, a counter 138 and a gate circuit 139 and which is fabricated integrally with the liquid crystal shutter panel 109. The shift register 137 takes out the image signal of each picture element (the portion 109a) of the liquid crystal shutter panel 109 on the basis of data clock pulses C3 input by a clock pulse generating circuit 141. Gradation count clock pulses C4 are input by a clock pulse generating circuit 142 to the counter 138, and the counter 138 converts each color density into the count of the clock pulses C4. Prior to the imagewise exposure, a common voltage V0 (an alternating voltage consisting of continuous pulses having a pulse width shorter than the response time of the liquid crystal shutter panel 109) higher than the threshold value is applied across the transverse electrode 112 and the longitudinal electrodes 113 of the liquid crystal shutter panel 109. Therefore, each picture element 109a of the liquid crystal shutter panel 109 is adjusted to the light intercepting condition. The gate circuit 139 is operated with the timing synchronous with the rotation of the RGB filter 4, and feeds signal voltages V1, V2, . . . , Vn for making the common voltage V0 lower than the threshold value to the longitudinal electrodes 113 as long as the clock pulses C4 in a number corresponding to each color density are counted. Accordingly, of the picture elements 109a1, 109a2, . . . , 109an adjusted to the light intercepting condition as described above, those at which the voltage across the transverse electrode 112 and the longitudinal electrodes 113 is made lower than the threshold value are adjusted to the light transmitting condition (light portion).

Figure 12:
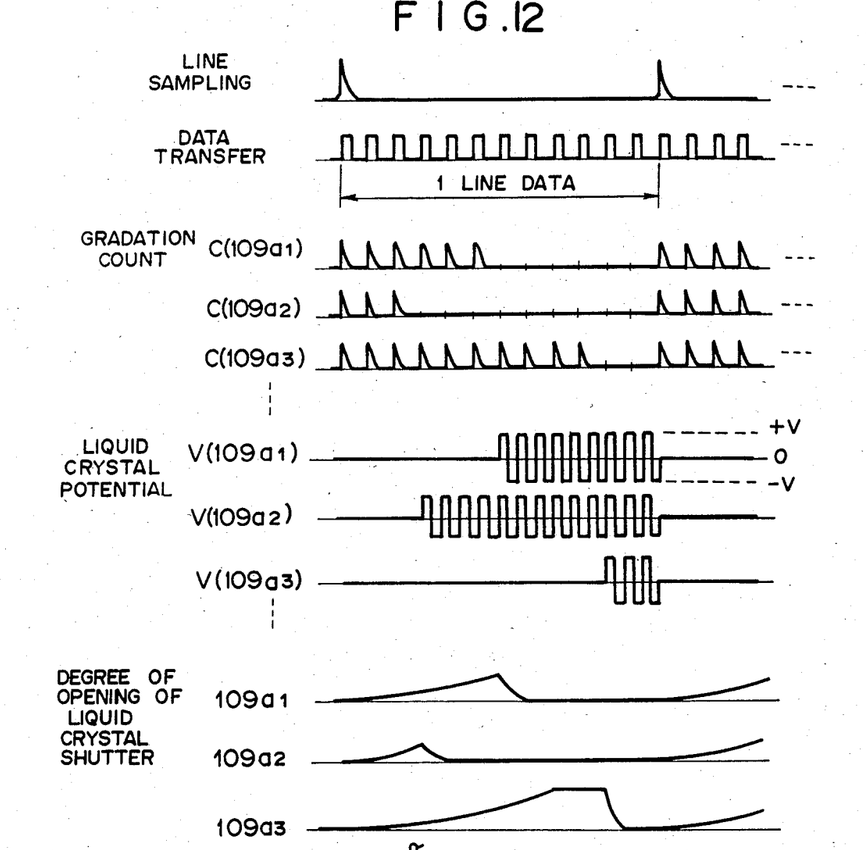
FIG. 12 is an explanatory view showing the operation of the liquid crystal shutter panel in the printer of FIG. 8.

As shown in FIG. 12, the time for which the clock pulses C4 are counted, i.e. the time for which the common voltage V0 is made lower than the threshold value, can be controlled in accordance with the image signals. Therefore, by a difference in the counts of the clock pulses C4, it is possible to control the degrees of opening of the picture elements 109a1, 109a2, . . . , 109an (i.e. the amount of light L to which the photosensitive material 103 is exposed). Thus the photosensitive material 103 is exposed to light in the form of an image having gradation.

Figure 13:
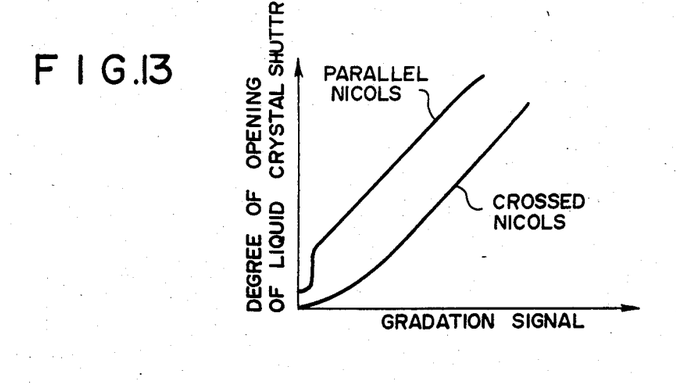
FIG. 13 is a graph showing the opening response characteristics of the liquid crystal shutter panel used in the embodiment of FIG. 8 in comparison with those of the other liquid crystal shutter panel.
Figure 14:
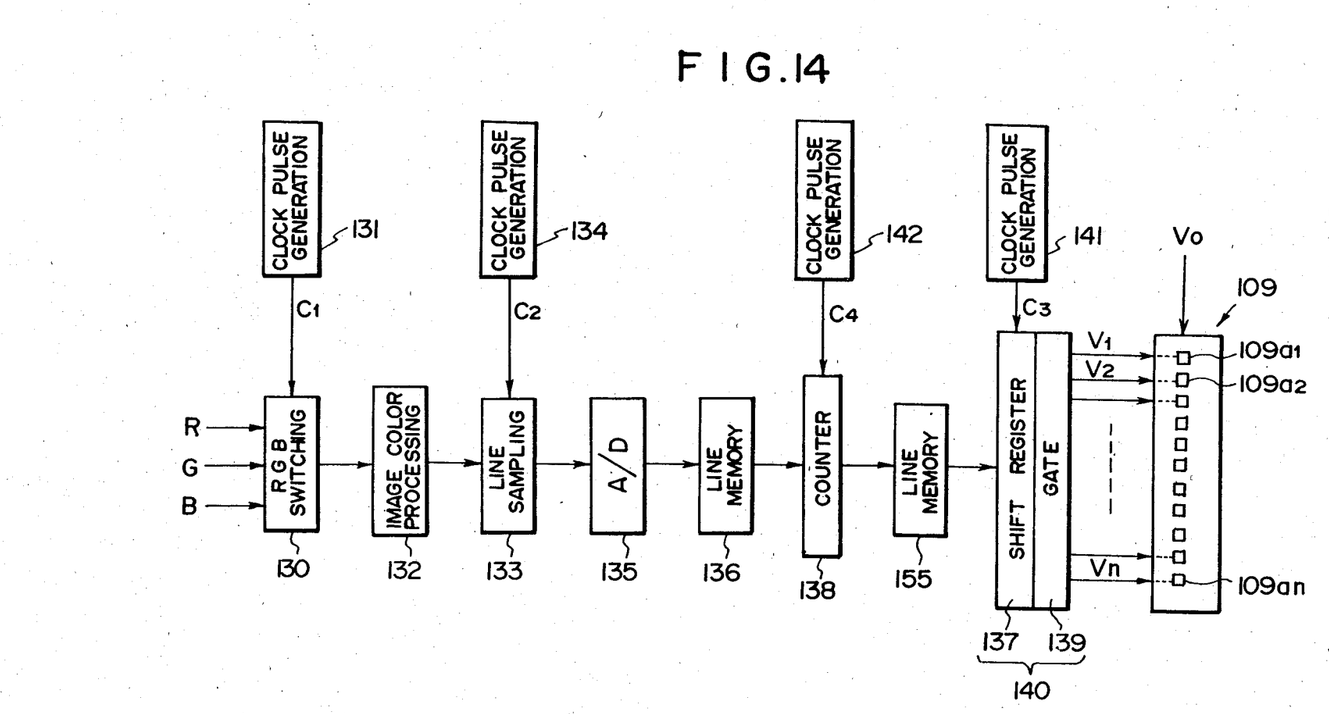
FIGS. 14 and 15 are block diagrams showing the control circuit configurations of the printer used in further embodiments of the image forming method in accordance with the present invention.

Exposure to light via the liquid crystal shutter panel 109 is conducted at each position of the photosensitive material 103 for each of the R, G and B signals in synchronization with the rotation of the RGB filter 104. Further, since the photosensitive material 103 is moved as described above, it is exposed in the form of a two-dimensional color image. Before mentioned, in the liquid crystal shutter panel 109 which intercepts light upon application of a voltage, the opening response of the liquid crystal shutter panel 109 when application of the voltage is ceased is comparatively slow, and the closing response thereof is quick. Therefore, it is possible to obtain very many levels of gradation by finely controlling the counts of the clock pulses C4. FIG. 13 shows the relationships between the gradation signal and the degree of opening of the liquid crystal shutter panel in the cases of the parallel nicols type twisted nematic liquid crystal shutter and the crossed nicols type twisted nematic liquid crystal shutter which is used in the embodiment of FIG. 8. As clear from FIG. 13, when the parallel nicols type twisted nematic liquid crystal shutter is used, it is difficult to finely adjust gradation in the low density region.

Further, as shown in FIG. 10, in the case of the crossed nicols type twisted nematic liquid crystal shutter, the amount of leak light does not depend on the wavelength of the light, and is small. Accordingly, it is possible to form a color image by use of the same liquid crystal shutter panel 109 and to use a photosensitive material exhibiting a wide latitude of exposure as the photosensitive material 103.

The control circuit configuration of the printer shown in FIG. 11 may be modified as shown in FIG. 16 so that the counter 138 is separated from the liquid crystal shutter driver 140 and positioned on the side of the main body of the circuit configuration. In this case, it becomes possible to minimize the size of the liquid crystal shutter driver 140 which is fabricated integrally with the liquid crystal shutter panel 109. Further, in this case, the count signal obtained by counting the clock pulses C4 by the counter 138 is stored in the line memory 155.

Figure 15:
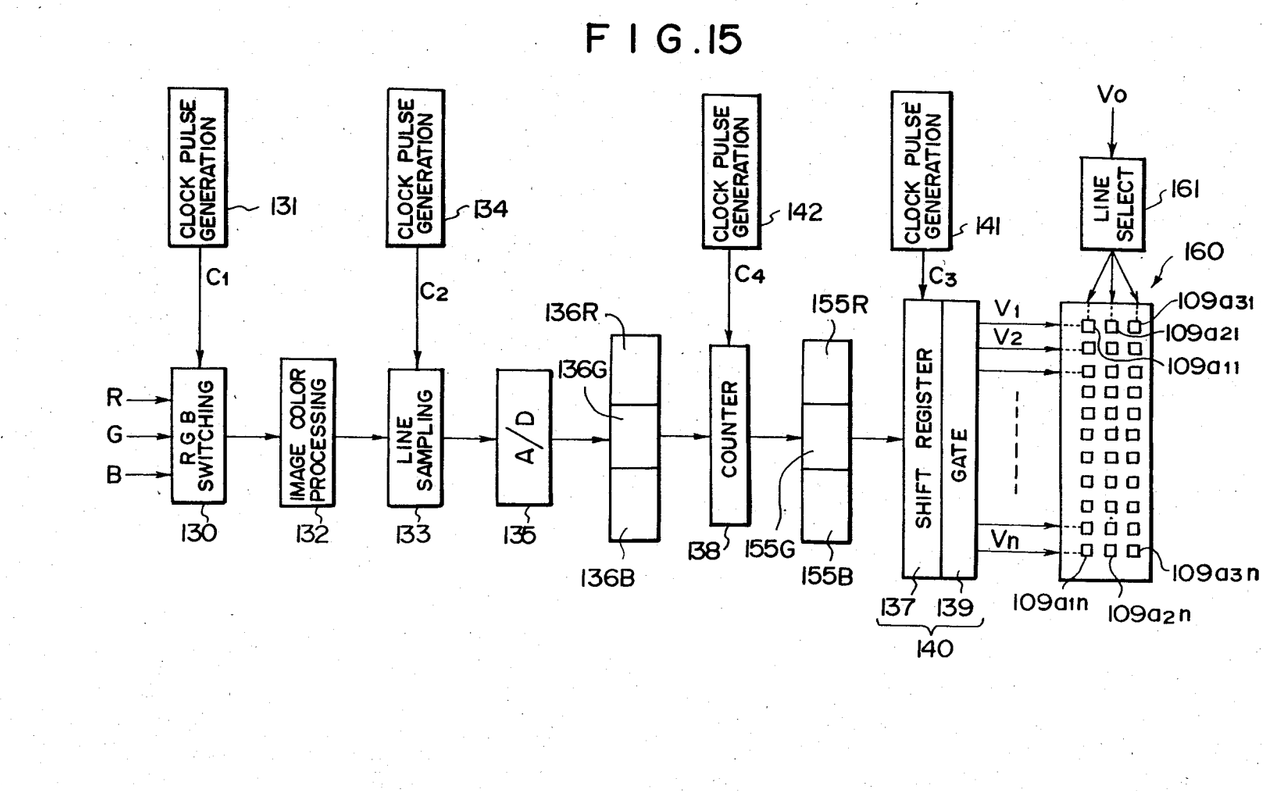

It is also possible to modify the control circuit configuration of the printer as shown in FIG. 15. In FIG. 15, line memories 136R, 136G and 136B for the R, G and B signals, and line memories 155R, 155G and 155B for storing the counts of the clock pulses C4 for the R, G and B signals are positioned. A liquid crystal shutter panel 160 comprises three transverse electrodes 112 used for R, G and B. That is, the liquid crystal shutter panel 160 is provided with a picture element row consisting of 109a11, 109a12, ..., 109a1n, a picture element row consisting of 109a21, 109a22, ... 109a2n, and a picture element row consisting of 109a31, 109a32, ..., 109a3n. R, G and B filters are secured in conformity with the arrays of the liquid crystal shutter panel 160. The transverse electrodes 112 to which the common voltage V0 is applied are sequentially selected by a line selecting circuit 161, and exposure to light of each color is conducted as the photosensitive material 103 passes under each array. In this case, the mechanism for driving the RGB filter becomes unnecessary, and the utilization efficiency of the light L1 is improved.

As described above, a photosensitive material exhibiting the toe-cut characteristics is used as the color photosensitive material 103. For use in combination with the liquid crystal shutter panel, a photosensitive material exhibiting inherent toe-cut characteristics of the silver halide photosensitive materials is rather suitable than those exhibiting the continuous characteristics.

Also in the embodiment of FIG. 8, when a photosensitive material requiring ordinary development processing is used as the color photosensitive material 103, it is possible to feed the color photosensitive material 103 automatically to a development unit by the conveyor belt 108. As the color photosensitive material 103, it is also possible to use an instant film as described with reference to the embodiment of FIG. 1.

Though the embodiments as described above are applied to printers for obtaining color prints, the image forming method of the present invention is applicable also to an apparatus for forming a monochromatic density image, which has no means for formation of color images.

I claim:

1. An image forming method in which a liquid crystal shutter array operable as a light valve is positioned between a photosensitive material and a light source, and light emitted by said light source to said photosensitive material is controlled by driving each liquid crystal shutter portion constituting a picture element of said liquid crystal shutter array, thereby conducting imagewise exposure of said photosensitive material to the light, wherein the improvement comprises controlling the drive of said liquid crystal shutter portion by supplying to said liquid crystal shutter portion driving pulses having a pulse width shorter than the response time of the liquid crystal and by changing the effective duration of said driving pulses as a function of image density information of an image signal, and using a photosensitive material which can express a half tone as said photosensitive material.

2. A method as defined in claim 1 wherein a photosensitive material exhibiting the toe-cut characteristics in used as said photosensitive material.

3. A method as defined in claim 1 wherein said liquid crystal shutter array is of the type normally intercepting the light.

4. A method as defined in claim 3 wherein said liquid crystal shutter array or said liquid crystal shutter matrix is a parallel nicols type twisted nematic liquid crystal shutter array.

5. An image forming method in which a liquid crystal shutter array operable as a light valve is positioned between a photosensitive material and a light source, and light emitted by said light source to said photosensitive material is controlled by driving each liquid shutter portion constituting a picture element of said liquid crystal shutter array, thereby conducting imagewise exposure of said photosensitive material to the light, wherein the improvement comprises using a liquid crystal shutter array of the type intercepting light upon application of a voltage thereto, continuously applying a pulse voltage having a pulse width shorter than the response time of the liquid crystal to the liquid crystal shutter panel prior to the exposure of said photosensitive material to the light, thereby intercepting the light, thereafter stopping the application of the voltage to the liquid crystal shutter for a time corresponding to an image signal so that the liquid crystal shutter allows the light to pass therethrough, and using a photosensitive material which can express a half tone as said photosensitive material.

6. A method as defined in claim 5 wherein a photosensitive material exhibiting the toe-cut characteristics is used as said photosensitive material.

7. A method as defined in claim 5 wherein said liquid crystal shutter array is a crossed nicols type twisted nematic liquid crystal shutter array of matrix.

8. A method as defined in claim 1 wherein the effective duration of said driving pulses is changed by changing the pulse width thereof.

9. A method as defined in claim 1 wherein the effective duration of said driving pulses is changed by changing the number of driving pulses that are supplied to said liquid crystal shutter portion during a predetermined period.

* * * * *